United States Patent
Spierling

(10) Patent No.: US 11,649,064 B2
(45) Date of Patent: May 16, 2023

(54) INTEGRATED MOTOR DRIVE COOLING

(71) Applicant: Hamilton Sundstrand Corporation, Charlotte, NC (US)

(72) Inventor: Todd A. Spierling, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 265 days.

(21) Appl. No.: 16/945,139

(22) Filed: Jul. 31, 2020

(65) Prior Publication Data

US 2021/0031936 A1    Feb. 4, 2021

Related U.S. Application Data

(60) Provisional application No. 62/882,275, filed on Aug. 2, 2019.

(51) Int. Cl.
*B64D 33/08* (2006.01)
*B64D 27/02* (2006.01)
*B64D 37/04* (2006.01)

(52) U.S. Cl.
CPC ............ *B64D 33/08* (2013.01); *B64D 27/02* (2013.01); *B64D 37/04* (2013.01); *B64D 2027/026* (2013.01)

(58) Field of Classification Search
CPC .. B64D 27/02; B64D 2027/026; B64D 33/08; B64D 37/04
USPC ...................................................... 244/53 R
See application file for complete search history.

(56) References Cited

U.S. PATENT DOCUMENTS

| | | | |
|---|---|---|---|
| 4,869,071 | A | 9/1989 | Wehner et al. |
| 8,884,479 | B2 | 11/2014 | Burnett et al. |
| 9,006,942 | B2 | 4/2015 | Lemmers, Jr. et al. |
| 9,306,433 | B2 | 4/2016 | Sten et al. |
| 10,086,946 | B1 | 10/2018 | Zywiak et al. |
| 10,138,899 | B2 | 11/2018 | Joubert et al. |

(Continued)

FOREIGN PATENT DOCUMENTS

| | | |
|---|---|---|
| CA | 3033189 A1 | 2/2018 |
| CN | 109803891 A | 5/2019 |

(Continued)

OTHER PUBLICATIONS

Extended European Search Report dated Dec. 18, 2020, issued during the prosecution of European Patent Application No. 20189099.3.

(Continued)

*Primary Examiner* — Brady W Frazier
(74) *Attorney, Agent, or Firm* — Locke Lord LLP; Scott D. Wofsy; Alicia J. Carroll

(57) ABSTRACT

A cooling system includes a thermal engine having a fluid output, and a motor drive having a fluid inlet in fluid communication with the fluid output of the thermal engine. The fluid inlet of the motor drive is downstream from the fluid output of the thermal engine. The system includes a fluid storage downstream from the motor drive and a fluid output of the motor drive. A method of cooling a motor drive includes outputting a cooling fluid from a fluid output of a thermal engine, receiving the cooling fluid from the fluid output of the thermal engine in a fluid inlet of a motor drive, passing the cooling fluid through the motor drive to a fluid output of the motor drive, receiving the cooling fluid in a fluid storage.

16 Claims, 2 Drawing Sheets

(56) References Cited

U.S. PATENT DOCUMENTS

| | | |
|---|---|---|
| 10,150,570 B2 | 12/2018 | Joubert et al. |
| 10,177,424 B1 | 1/2019 | Melack et al. |
| 2006/0237583 A1 | 10/2006 | Fucke et al. |
| 2007/0163822 A1 | 7/2007 | Grieve |
| 2010/0006073 A1 | 1/2010 | Jatkar |
| 2010/0254081 A1 | 10/2010 | Koenig et al. |
| 2010/0282439 A1 | 11/2010 | Summerer |
| 2011/0108239 A1 | 5/2011 | Bruno et al. |
| 2012/0192578 A1 | 8/2012 | Finney |
| 2013/0277009 A1 | 10/2013 | Army |
| 2013/0300120 A1 | 11/2013 | Podrog |
| 2014/0318132 A1 | 10/2014 | Podrog |
| 2016/0229282 A1 | 8/2016 | Hettrich et al. |
| 2017/0291712 A1 | 10/2017 | Himmelmann et al. |
| 2017/0305559 A1 | 10/2017 | Bruno et al. |
| 2017/0306786 A1 | 10/2017 | Bruno et al. |
| 2018/0050810 A1 | 2/2018 | Niergarth |
| 2018/0050811 A1 | 2/2018 | Niergarth et al. |
| 2019/0010866 A1 | 1/2019 | Snyder et al. |
| 2019/0014687 A1 | 1/2019 | Snyder |
| 2020/0047908 A1* | 2/2020 | Filipenko ............... F02C 3/00 |
| 2020/0130534 A1* | 4/2020 | Julien .................. F01P 3/12 |
| 2020/0277061 A1* | 9/2020 | Becker ................ B60L 50/16 |
| 2020/0277066 A1* | 9/2020 | Becker ................ B64D 31/12 |
| 2020/0277075 A1* | 9/2020 | Dubreuil ............... H02K 9/26 |

FOREIGN PATENT DOCUMENTS

| | | | |
|---|---|---|---|
| DE | 102004036296 A1 | 2/2006 | |
| DE | 102010021890 A1 | 12/2011 | |
| DE | 102010034830 A1 | 2/2012 | |
| DE | 102011105968 A1 | 1/2013 | |
| EP | 1947008 A1 | 7/2008 | |
| EP | 2458717 A2 | 5/2012 | |
| EP | 3252930 A1 | 12/2017 | |
| EP | 3643889 A1 | 4/2020 | |
| FR | 2936393 A1 * | 3/2010 | ............ B60K 11/02 |
| FR | 2936393 A1 | 3/2010 | |
| JP | 2006231974 A | 9/2006 | |
| JP | 2009187756 A | 8/2009 | |
| JP | 2016001589 A | 1/2016 | |
| KR | 20060094418 A | 8/2006 | |
| WO | 200561323 A1 | 7/2005 | |
| WO | 2007149857 A2 | 12/2007 | |
| WO | 2009156120 A2 | 12/2009 | |
| WO | 201081123 | 7/2010 | |
| WO | 2011147977 A2 | 12/2011 | |
| WO | 2011153533 A2 | 12/2011 | |
| WO | 2012118140 A1 | 9/2012 | |
| WO | 2012167274 A1 | 12/2012 | |
| WO | 2013113006 A1 | 8/2013 | |

OTHER PUBLICATIONS

EP Communication Pursuant to Art 94(3) EPC dated Jul. 6, 2022, issued during the prosecution of European Patent Application No. EP 20189099.3, 4 pages.

* cited by examiner

INTEGRATED MOTOR DRIVE COOLING

CROSS-REFERENCE TO RELATED APPLICATION

This application claims priority to and the benefit of U.S. Provisional Patent Application Ser. No. 62/882,275, filed Aug. 2, 2019, the contents thereof being incorporated herein by reference in their entirety.

BACKGROUND OF THE INVENTION

1. Field of the Invention

The present disclosure relates to motor drive cooling, and in particular to motor drive cooling for hybrid electric aircraft.

2. Description of Related Art

Aircraft cooling circuits, such as those used for cooling electronics, traditionally rely on a circulating liquid system to carry heat from the electronics to a liquid-to-air heat exchanger (radiator) for overboard dissipation. This circulating liquid system generally requires an added fluid (coolant) circuit, a pump and a radiator. These added components generally increase weight and drag.

The conventional techniques have been considered satisfactory for their intended purpose. However, there is an ever present need for improved systems and methods for cooling electronics. This disclosure provides a solution for this need.

SUMMARY

A cooling system includes a thermal engine having a fluid output, and a motor drive having a fluid inlet in fluid communication with the fluid output of the thermal engine. The fluid inlet of the motor drive is downstream from the fluid output of the thermal engine. The system includes a fluid storage downstream from the motor drive and a fluid output of the motor drive.

In some embodiments, the system can include a motive flow fluid circuit defined from the fluid output of the thermal engine, through the fluid inlet of the motor drive and the motor drive, and to the fluid storage. The fluid storage includes at least one scavenge pump in fluid communication with the motive flow fluid circuit. The fluid storage can be a fuel storage configured and adapted to be positioned in a wing of an aircraft. The fluid storage can be a fuel storage that can include a primary fuel storage and a collector bay. The fluid storage can include a fluid outlet and the thermal engine can include a fluid inlet, wherein the fluid outlet of the fluid storage can be in fluid communication with the fluid inlet of the thermal engine by way of a fluid supply flow path. The fluid inlet of the thermal engine can be downstream from the fluid outlet of the fluid storage along the fluid supply flow path. The fluid supply flow path can be a fuel supply flow path.

In accordance with another aspect, a hybrid-electric propulsion system includes a thermal engine including a fluid output, an electrical motor, an air mover operatively connected to the electrical motor and to the thermal engine, and a motor drive operatively connected to the electrical motor to provide power thereto. The motor drive includes a fluid inlet in fluid communication with the fluid output of the thermal engine. The fluid inlet of the motor drive is downstream from the fluid output of the thermal engine. The hybrid-electric propulsion system includes a fuel storage in fluid communication with the thermal engine to provide fuel thereto. The fuel storage is downstream from the motor drive and a fluid output of the motor drive. The hybrid-electric propulsion system includes an electrical energy storage operatively connected to the motor drive to provide power thereto.

In certain embodiments, the system includes a motive flow fluid circuit defined from the fluid output of the thermal engine, through the fluid inlet of the motor drive and the motor drive, and to the fuel storage. The fuel storage can include at least one scavenge pump in fluid communication with the motive flow fluid circuit. The fuel storage can include a primary fuel storage and a collector bay. The fuel storage can include a fluid outlet and the thermal engine can include a fluid inlet. The fluid outlet of the fluid storage can be in fluid communication with the fluid inlet of the thermal engine by way of a fluid supply flow path. The fluid inlet of the thermal engine can be downstream from the fluid outlet of the fluid storage along the fluid supply flow path.

In accordance with another aspect, a method of cooling a motor drive includes outputting a cooling fluid from a fluid output of a thermal engine, receiving the cooling fluid from the fluid output of the thermal engine in a fluid inlet of a motor drive, passing the cooling fluid through the motor drive to a fluid output of the motor drive, receiving the cooling fluid in a fluid storage. The method can include dissipating heat from the cooling fluid to atmosphere via an aircraft skin. Outputting, receiving and passing the cooling fluid can include outputting, receiving and passing the cooling fluid via a motive flow fluid circuit defined from the fluid output of the thermal engine, through the fluid inlet of the motor drive and the motor drive, and to the fluid storage.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION

Figure 1:
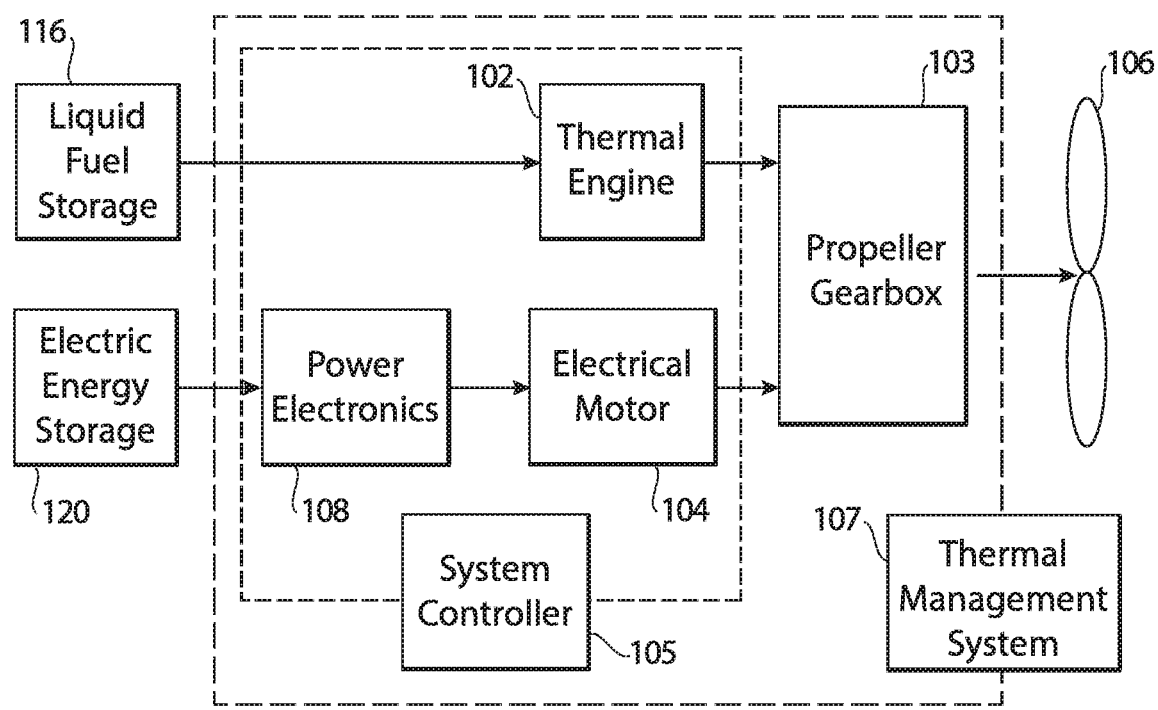
FIG. 1 is a schematic depiction of an embodiment of a hybrid-electric propulsion system constructed in accordance with the present disclosure, showing the motor drive.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIG. 2, as will be described to facilitate a hybrid-electric propulsion system for an aircraft having a cooling system for a motor drive that facilitates reduced weight and drag, resulting in reduced fuel burn and reduced aircraft drag.

As shown in FIG. 1, a hybrid-electric propulsion system 100, e.g. a parallel hybrid-electric propulsion system, includes a thermal engine 102 including a fluid output 110, an electrical motor 104, an air mover 106 operatively connected to the electrical motor 104 and to thermal engine 102 by way of a gearbox 103, and a motor drive 108 operatively connected to electrical motor 104 to provide power thereto. The hybrid-electric propulsion system 100 includes an electrical energy storage 120 operatively connected to motor drive 108 to provide power thereto. A fuel storage 116 is in fluid communication with thermal engine 102 to provide fuel thereto.

With continued reference to FIG. 1, parallel hybrid aircraft use a combination of a fuel burning powertrain leg (e.g. the thermal engine 102) and an electric powertrain leg (e.g. the electrical motor 104) to drive a fan, propeller, or the like (e.g. an air mover 106). A system controller 105 is used for, among other things, controlling power output from the electric and/or fuel burning power trains. A thermal management system 107 is used for to provide cooling for the thermal engine 102 and electric motor 104. This may consist of nacelle installed oil and/or coolant loops with the associate engine driven pumps and radiators. The electric powertrain typically relies on large power electronics (contained in motor drive 108) to process the electric power and drive electric motor 104 at the appropriate speed and power level. The fuel burning powertrain relies on a supply of liquid fuel from the aircraft fuel tanks, e.g. fuel storage 116. Those skilled in the art will readily appreciate that portions of electric or fuel burning powertrain (e.g. the air mover, electrical motor, and/or thermal engine) can be positioned in a nacelle (not shown) on a wing 140 of an aircraft 141.

Figure 2:
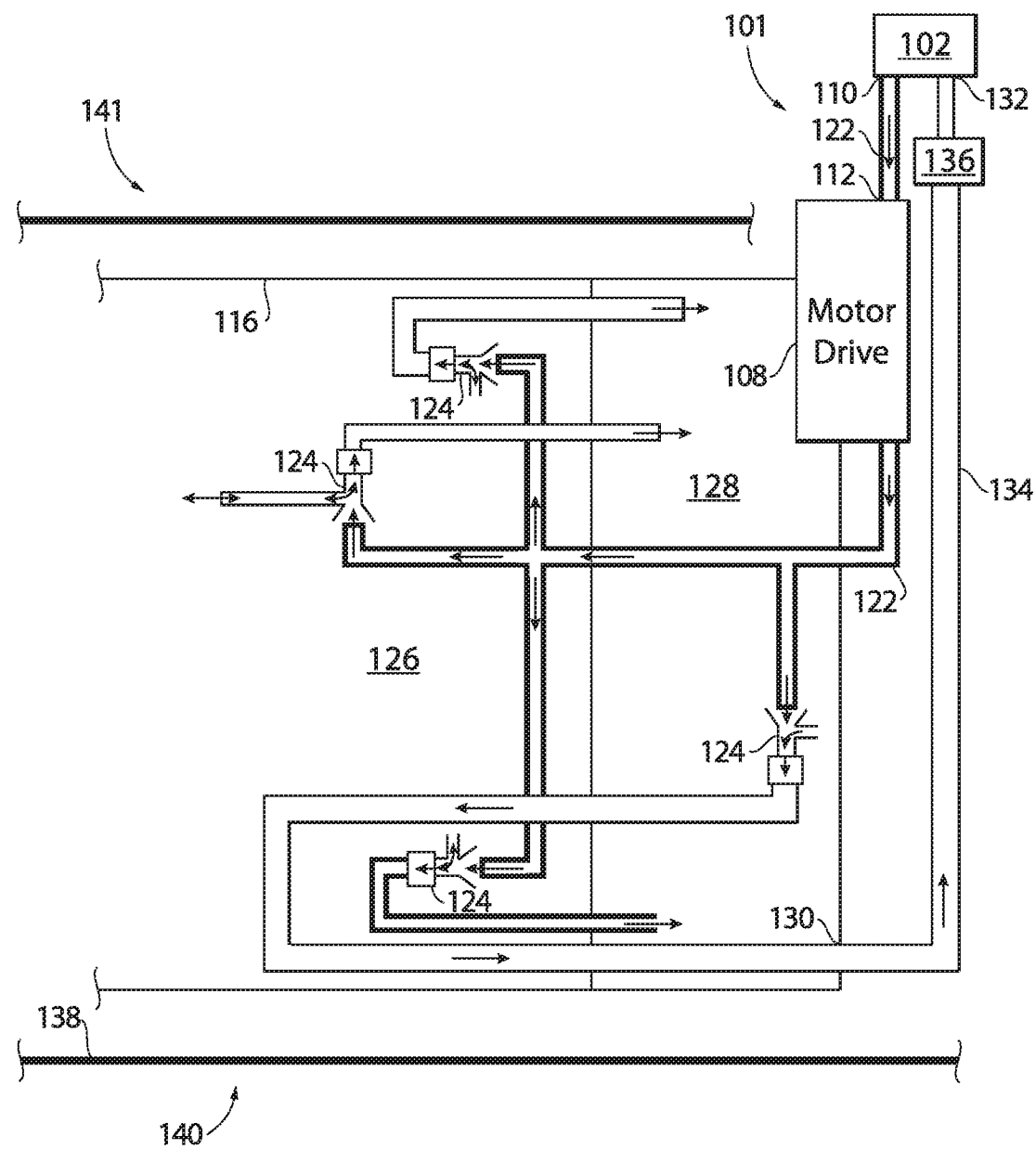
FIG. 2 is a schematic depiction of an embodiment of a cooling system of the hybrid-electric propulsion system constructed in accordance with the present disclosure, showing the motive flow fluid circuit.

With reference to FIG. 2, the system 100 includes a cooling system 101 for motor drive 108. Cooling system 101 is included at least partially within hybrid-electric propulsion system 100. Motor drive 108 includes a fluid inlet 112 in fluid communication with fluid output 110 of thermal engine 102. Fluid inlet 112 of motor drive 108 is downstream from the fluid output 110 of thermal engine 102. Cooling system 101 includes a motive flow fluid circuit 122 defined from a fluid output 110 of the thermal engine 102, through fluid inlet 112 of motor drive 108 and motor drive 108, and to fuel storage 116. Motive flow fluid circuit 122 is part of what is known as a "motive flow" fuel system to move fuel from a variety of wing tanks, a primary fuel storage 126, to a single collector tank, e.g. collector bay 128, and then on to the engine fuel pump 136. Aircraft generally rely on fuel return from engine 102 to drive scavenge ejector (jet) pumps 124 for fuel movement and engine supply.

With continued reference to FIG. 2, by routing at least a portion of motive flow fluid circuit 122 through motor drive 108, motive flow fluid circuit 122 acts as a cooling circuit to cool the various power electronics of motor drive 108, such as inverters, rectifiers, and the like. In embodiments of the present disclosure, motor drive 108 is introduced into the motive flow fluid circuit 122 carrying fuel from the engine 102 and engine fuel pump 136 back to the wing tank, e.g. fuel storage 116. Because motive flow fluid circuit 122 is already existing in most aircraft motor drive losses are carried away using an existing aircraft system. As such, motive flow fluid circuit 122 provides cooling for motor drive 108 while avoiding the need for an additional fluid lines, pumps, reservoirs, aircraft fluids, radiator, heat sink, or the like. Since no additional equipment is added, aircraft weight and fuel burn is reduced, and, since no airflow needs to be ducted through a radiator, aircraft drag is reduced. This results in aircraft 141 having reduced drag and weight, as compared to an aircraft with a separate cooling circuit for motor drive 108. Motor drive 108 has other inputs and outputs, as shown in FIG. 1, that connect motor drive 108 to a power source 120 and to electrical motor 104.

With continued reference to FIG. 2, cooling system 101 includes motor drive 108, thermal engine 102 and fluid output 110 of thermal engine 102. Cooling system 101 includes fuel storage 116 downstream from motor drive 108 and a fluid output 114 of motor drive 108. As fuel travels through motive flow fluid circuit 122, fuel will carry the heat from the motor drive 108 into the primary fuel storage 126, e.g. a wing tank, where the heated fuel will be cooled through skin 138 of aircraft 141 into the surrounding atmosphere. At least a portion of fuel storage 116, e.g. primary fuel storage 126, is configured and adapted to be positioned in a wing 140 of aircraft 141 such that heat from the fuel being returned from motor drive 108 to fuel storage 116 is dissipated via airflow over the wing.

As shown in FIG. 2, fuel storage 116 includes a plurality of scavenge pumps 124 in fluid communication with motive flow fluid circuit 122. Fuel storage 116 include a primary fuel storage 126 and a collector bay 128. As fuel from thermal engine 102 returns back to fuel storage 116 along motive flow fluid circuit 122, it goes back into primary storage 116 or (in the event that fuel storage level is a given scavenge pump inlet, it can go into collector bay 128). Collector bay 128 of fuel storage 116 can be in the wing, or separate therefrom. Fuel storage 116 includes a fluid outlet 130 and the thermal engine 102 includes a fluid inlet 132. Fluid outlet 130 of fuel storage 116 is in fluid communication with fluid inlet 132 of thermal engine 102 by way of a fluid supply flow path 134, e.g. a fuel supply flow path. Fluid inlet 132 of thermal engine 102 is downstream from fluid outlet 130 of fuel storage 116 along fluid supply flow path 134.

A method of cooling a motor drive, e.g. motor drive 108, includes outputting a cooling fluid from a fluid output, e.g. fluid output 110, of a thermal engine, e.g. thermal engine 102, receiving the cooling fluid from the fluid output of the thermal engine in a fluid inlet, e.g. fluid inlet 112, of the motor drive, passing the cooling fluid through the motor drive to a fluid output, e.g. fluid output 114, of the motor drive, receiving the cooling fluid in a fluid storage, e.g. fuel storage 116. The method includes dissipating heat from the cooling fluid to atmosphere via an aircraft skin, e.g. aircraft skin 138. Outputting, receiving and passing the cooling fluid includes outputting, receiving and passing the cooling fluid via a motive flow fluid circuit, e.g. motive flow fluid circuit 122, defined from the fluid output of the thermal engine, through the fluid inlet of the motor drive and the motor drive, and to the fluid storage.

The methods and systems of the present disclosure, as described above and shown in the drawings, provide for reduced weight and drag, which results in reduced fuel consumption. While the apparatus and methods of the subject disclosure have been shown and described with reference to preferred embodiments, those skilled in the art will readily appreciate that changes and/or modifications may be made thereto without departing from the scope of the subject disclosure.

What is claimed is:
1. A cooling system comprising:
a thermal engine having a fluid output;
a motor drive having a fluid inlet in fluid communication with the fluid output of the thermal engine, wherein the fluid inlet of the motor drive is downstream from the fluid output of the thermal engine and is configured and adapted to receive fuel from the thermal engine for cooling the motor drive;

a fuel storage in fluid communication with the thermal engine to provide fuel thereto, wherein the fuel storage is downstream from and in fluid communication with the motor drive and a fuel output of the motor drive, and wherein the thermal engine is configured and adapted to burn at least a portion of the fuel from the fuel storage.

2. The system as recited in claim 1, further comprising a motive flow fluid circuit defined from the fluid output of the thermal engine, through the fluid inlet of the motor drive and the motor drive, and to the fuel storage.

3. The system as recited in claim 2, wherein the fuel storage includes at least one scavenge pump in fluid communication with the motive flow fluid circuit.

4. The system as recited in claim 1, wherein the fuel storage is configured and adapted to be positioned in a wing of an aircraft.

5. The system as recited in claim 1, wherein the fuel storage includes a primary fuel storage and a collector bay.

6. The system as recited in claim 1, wherein the fuel storage includes a fuel outlet and the thermal engine includes a fuel inlet, wherein the fuel outlet of the fuel storage is in fluid communication with the fuel inlet of the thermal engine by way of a fuel supply flow path.

7. The system as recited in claim 6, wherein the fuel inlet of the thermal engine is downstream from the fuel outlet of the fuel storage along the fluid fuel supply flow path.

8. A hybrid-electric propulsion system comprising:
a thermal engine including a fuel output;
an electrical motor;
an air mover operatively connected to the electrical motor and to the thermal engine;
a motor drive operatively connected to the electrical motor to provide power thereto, wherein the motor drive includes a fluid inlet in fluid communication with the fuel output of the thermal engine, wherein the fluid inlet of the motor drive is downstream from the fuel output of the thermal engine;
a fuel storage in fluid communication with the thermal engine to provide fuel thereto, wherein the fuel storage is downstream from the motor drive and a fluid output of the motor drive, wherein the thermal engine is configured and adapted to burn at least a portion of the fuel from the fuel storage; and
an electrical energy storage operatively connected to the motor drive to provide power thereto.

9. The system as recited in claim 8, further comprising a motive flow fluid circuit defined from the fuel output of the thermal engine, through the fluid inlet of the motor drive and the motor drive, and to the fuel storage.

10. The system as recited in claim 9, wherein the fuel storage includes at least one scavenge pump in fluid communication with the motive flow fluid circuit.

11. The system as recited in claim 8, wherein the fuel storage includes a primary fuel storage and a collector bay.

12. The system as recited in claim 8, wherein the fuel storage includes a fuel outlet and the thermal engine includes a fuel inlet, wherein the fuel outlet of the fuel storage is in fluid communication with the fuel inlet of the thermal engine by way of a fluid supply flow path.

13. The system as recited in claim 12, wherein the fluid inlet of the thermal engine is downstream from the fluid outlet of the fuel storage along the fluid supply flow path.

14. A method of cooling a motor drive, the method comprising:
receiving fuel from a fuel storage into a thermal engine and burning at least a portion of the fuel from the fuel storage,
outputting a portion of the fuel from a fluid output of a thermal engine;
receiving the fuel from the fluid output of the thermal engine in a fluid inlet of a motor drive;
passing the fuel through the motor drive to a fluid output of the motor drive; and
receiving the fuel in the fuel storage.

15. The method as recited in claim 14, further comprising dissipating heat from the fuel to atmosphere via an aircraft skin.

16. The method as recited in claim 14, wherein outputting, receiving the fuel from the fluid output of the thermal engine, and passing the fuel includes outputting, receiving the fuel from the fluid output of the thermal engine and passing the fuel via a motive flow fluid circuit defined from the fluid output of the thermal engine, through the fluid inlet of the motor drive and the motor drive, and to the fuel fluid storage.

* * * * *